United States Patent
Kant et al.

(10) Patent No.: US 11,720,374 B1
(45) Date of Patent: Aug. 8, 2023

(54) DYNAMICALLY OVERRIDING A FUNCTION BASED ON A CAPABILITY SET

(71) Applicant: Microsoft Technology Licensing, LLC, Redmond, WA (US)

(72) Inventors: Pranav Kant, Kirkland, WA (US); Joseph Norman Bialek, Seattle, WA (US); Xiang Fan, Bellevue, WA (US); YongKang Zhu, Redmond, WA (US); Gabriel Thomas Kodjo Dos Reis, Issaquah, WA (US); Russell Bivens Keldorph, Seattle, WA (US); Mehmet Iyigun, Kirkland, WA (US); Russell Charles Hadley, Bellevue, WA (US); Roy Williams, Woodinville, WA (US); Kenneth Dean Johnson, Bellevue, WA (US); Pedro Miguel Sequeira De Justo Teixeira, Kirkland, WA (US); Yevgeniy Bak, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/724,329

(22) Filed: Apr. 19, 2022

Related U.S. Application Data

(60) Provisional application No. 63/309,112, filed on Feb. 11, 2022.

(51) Int. Cl.
*G06F 9/44* (2018.01)
*G06F 9/448* (2018.01)

(52) U.S. Cl.
CPC .................. *G06F 9/4486* (2018.02)

(58) Field of Classification Search
CPC ....................................................... G06F 9/44
See application file for complete search history.

(56) References Cited

U.S. PATENT DOCUMENTS

| | | | |
|---|---|---|---|
| 6,718,546 B1 | 4/2004 | Johnson | |
| 7,886,287 B1 * | 2/2011 | Davda | G06F 8/656 717/168 |
| 2013/0185705 A1 * | 7/2013 | Kuesel | G06F 8/443 719/331 |

(Continued)

OTHER PUBLICATIONS

"Binary decision diagram", Retrieved from: https://web.archive.org/web/20220205053144/https://en.wikipedia.org/wiki/Binary_decision_diagram, Oct. 4, 2021, 5 Pages.

(Continued)

*Primary Examiner* — Jae U Jeon
(74) *Attorney, Agent, or Firm* — Workman Nydegger

(57) ABSTRACT

Dynamically overriding a function based on a capability set. A computer system reads a portion of an executable image file. The portion includes a first memory address corresponding to a first callee function implementation. The first memory address was inserted into the portion by a compiler toolchain. Based on extensible metadata included in the executable image file, and based on a capability set that is specific to the computer system, the computer system determines a second memory address corresponding to a second callee function implementation. Before execution of the portion, the computer system modifies the portion to replace the first memory address with the second memory address.

18 Claims, 6 Drawing Sheets

(56) References Cited

U.S. PATENT DOCUMENTS

2020/0192808 A1* 6/2020 Kempf ................ G06F 12/0653
2021/0182390 A1* 6/2021 Winterrowd ............ G06F 21/56

OTHER PUBLICATIONS

"What is an indirect function (IFUNC)?", Retrieved from: https://web.archive.org/web/20211205130625/https://sourceware.org/glibc/wiki/GNU_IFUNC, Dec. 5, 2021, 3 Pages.

"International Search Report and Written Opinion Issued in PCT Application No. PCT/US22/050013", dated Feb. 24, 2023, 14 Pages. (MS# 411083-WO-PCT).

* cited by examiner

400

401
Within An Executable Image, Identify A Control Flow That Targets A Callee Function

402
Based On Extensible Metadata, And Based On A System-Specific Capability Set, Determine A Replacement Callee Function

403
Prior To Executing The Call, Modify The Control Flow To Target The Replacement Callee Function

*FIG. 4*

DYNAMICALLY OVERRIDING A FUNCTION BASED ON A CAPABILITY SET

CROSS-REFERENCE TO RELATED APPLICATIONS

This application claims priority to, and the benefit of, U.S. Provisional Patent Application Ser. No. 63/309,112, filed Feb. 11, 2022, entitled "DYNAMICALLY OVERRIDING A FUNCTION BASED ON A CAPABILITY SET," the entire contents of which are incorporated by reference herein in their entirety.

BACKGROUND

Different computer systems have different hardware and software capabilities. For example, even when implementing the same processor instruction set architecture (ISA)—such as the X64 ISA (sometimes referred to as "AMD64", "x86-64", "AMD x86-64", or "Intel64") or the ARM64 ISA (sometimes referred to as "AArch64")—two different processors may support different architectural extensions (e.g., additional instructions). For instance, the X64 ISA includes extensions such as Enhanced REP MOVSB and STOSB operation (ERMSB); Advanced Vector Extensions (AVX) such as AVX2, AVX-512, AVX-VNNI, etc.; Streaming SIMD Extensions (SSE) such as SSE2, SSE3, SSE4, etc.; Supplemental Streaming SIMD Extensions (SSSE) such as SSSE3; etc. The ARM64 ISA includes extensions such as interlocked intrinsics. Additionally, different computer systems may support different OS and security features depending on OS version, software license, available hardware capability, etc. Additionally, different computer systems may include additional hardware functionality, such as hardware accelerators (e.g., GPUs, custom application-specific integrated circuits).

BRIEF SUMMARY

In some scenarios, it is beneficial for a compiler toolchain to produce executable code that has been optimized for a given set of one or more capabilities; for example, a commonly used function like memcpy( ) can be implemented more efficiently based on whether or not optional extensions, such as AVX-512, ERMSB, etc., are available. However, executable code that relies on these optional extensions would be nonfunctional on computer systems that lack those extensions.

Thus, there is a need to produce executable images that are compatible across a wide range of target computer systems, which have varying sets of optional capabilities. One mechanism is for a function, itself, to perform checks at runtime for available capabilities of the computer system on which the code is executing (e.g., based on one or more global variables), and to directly branch an appropriate implementation of that function based on those checks. However, these runtime checks incur processing overheads, and use of conditional branches in this manner can lead to branch mispredictions and further processing overheads. Another mechanism is to call the function via an indirect branch instruction, where an argument of the branch instruction is a location (e.g., a register) that specifies where the destination address of the next instruction is located. Then, the destination address is determined at runtime (e.g., via a virtual lookup) based on computer system capability. However, indirect branches incur significant overheads in the lookup, and in additional security checks.

The embodiments described herein are directed to dynamically overriding a function based on a capability set during loading of an executable image into memory, based on replacing a first destination address of a default function implementation with a second destination address of a function implementation that is determined based on a capability set of the computer system on which the executable image is being loaded. As such, a destination address (e.g., of a direct call instruction, or of a jump instruction) is changed at load time, and prior to code execution, so that a function does not need to perform runtime checks, and so that a lookup for an indirect branch is not needed. In one embodiment, when compiling the executable image, a compiler toolchain includes a plurality of implementations of a function, including a default implementation that executes on all target computer system regardless of capability, and one or more optimized implementations that each relies one or more specific capabilities. The compiler toolchain then inserts an address of the default implementation of the function into a binary, and includes function override metadata that enables an operating system (OS) loader to "patch-up" (or fix-up) the binary to include an address of an optimized implementation of the function while loading the executable image into memory. Thus, when the loaded code is executed, the binary executes the optimized implementation of the function, rather than the default implementation of the function.

Advantageously, the embodiments herein can dramatically speed up program execution, particularly if the called function is relatively small and called frequently. For example, if a tight loop calls a function that is implemented using the embodiments herein, calls to an optimized implementation of the function can be made with a simple direct call. Without the embodiments herein, each iteration of the loop would incur either the overhead of the function performing a runtime check for computer system capability and a potential branch misprediction, or the overhead of a destination memory address lookup and additional security checks. Additionally, since embodiments perform patch-ups to call an optimized implementation of a function at load time (e.g., as opposed to during execution time), a program that has been patched-up to use the optimized implementation of the function will never see a memory page that doesn't have the patch-up applied.

In some aspects, the techniques described herein relate to a method, implemented at a computer system that includes a processor, for dynamically overriding a function based on a capability set, the method including: reading a portion of an executable image file, the portion including a first memory address corresponding to a first callee function implementation, the first memory address having been inserted into the portion by a compiler toolchain; based on extensible metadata included in the executable image file, and based on a capability set that is specific to the computer system, determining a second memory address corresponding to a second callee function implementation; and before execution of the portion, modifying the portion to replace the first memory address with the second memory address.

In some aspects, the techniques described herein relate to a computer system for dynamically overriding a function based on a capability set, including: a processor; and a computer storage media that stores computer-executable instructions that are executable by the processor to cause the computer system to at least: read a portion of an executable image file, the portion including a first memory address corresponding to a first callee function implementation, the first memory address having been inserted into the portion by a compiler toolchain; based on extensible metadata included in the executable image file, and based on a capability set that is specific to the computer system, determine a second memory address corresponding to a second callee function implementation; and before execution of the portion, modify the portion to replace the first memory address with the second memory address.

In some aspects, the techniques described herein relate to a computer program product including a computer storage media that stores computer-executable instructions that are executable by a processor to cause a computer system to dynamically override a function based on a capability set, the computer-executable instructions including instructions that are executable by the processor to cause the computer system to at least: read a portion of an executable image file, the portion including a first memory address corresponding to a first callee function implementation, the first memory address having been inserted into the portion by a compiler toolchain; based on extensible metadata included in the executable image file, and based on a capability set that is specific to the computer system, determine a second memory address corresponding to a second callee function implementation; and before execution of the portion, modify the portion to replace the first memory address with the second memory address.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates a flow chart of an example method for dynamically overriding a function based on a capability set.

DETAILED DESCRIPTION

Figure 1:
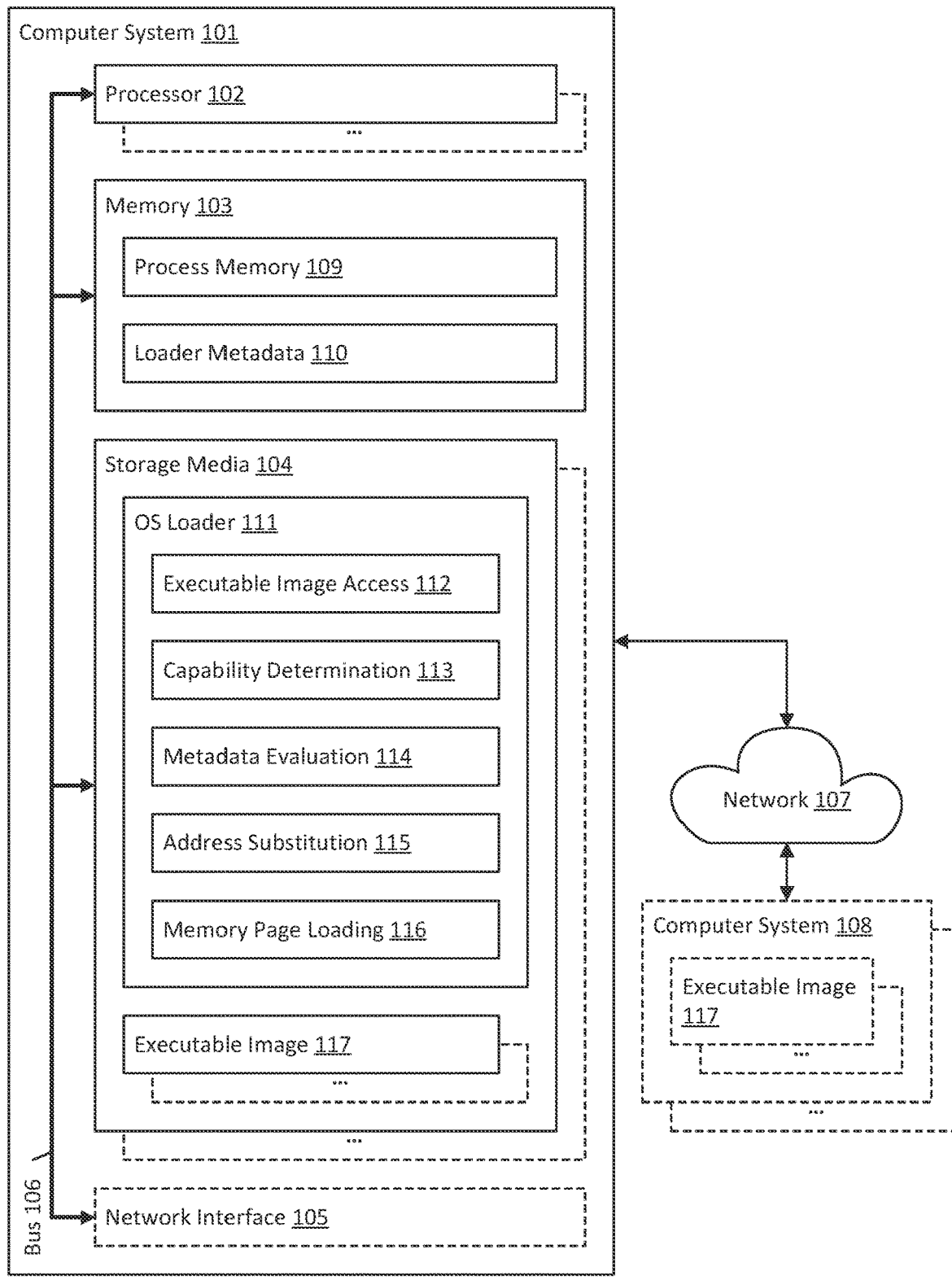
FIG. 1 illustrates an example computer architecture that facilitates dynamically overriding a function based on a capability set.

FIG. 1 illustrates an example computer architecture 100 that facilitates dynamically overriding a function based on a capability set. As shown, computer architecture 100 includes a computer system 101 comprising a processor 102 (or a plurality of processors), a memory 103, and one or more computer storage media (storage media 104), all interconnected by a bus 106. Computer system 101 may also include a network interface 105 for interconnecting (via a network 107) to one or more remote computer systems (e.g., computer system 108).

The storage media 104 is illustrated as storing computer-executable instructions implementing at least an OS loader 111 that is configured to load executable images, such as executable image 117, into memory 103 for execution at the processor 102. For example, computer architecture 100 illustrates process memory 109 within memory 103 and, in the description herein, this process memory 109 corresponds to at least executable memory pages (e.g., code pages) loaded from executable image 117. As shown, the executable image 117 is stored on the storage media 104, but it may originate from computer system 108. In embodiments, the executable image 117 is a Portable Executable (PE) binary used by the WINDOWS OS, a Mach-O binary used by MACOS, an Executable and Linkable Format (ELF) binary used by UNIX and LINUX-based OS's, and the like.

In embodiments, the executable image 117 comprises control flow targeting a memory address of a default implementation of a function (e.g., as an argument of a direct call instruction or a jump instruction). In some embodiments, the executable image 117 also includes one or more optimized implementations of the function. In other embodiments, the executable image 117 lacks any optimized implementation of the function; in these embodiments, optimized implementation(s) of the function are found in another executable image. The executable image 117 also comprises function override metadata that is used by the OS loader 111 to "patch-up" the executable image 117 when the OS loader 111 identifies the presence of one or more particular capabilities of computer system 101. In embodiments, OS loader 111 patches-up the executable image 117 to modify the targeted memory address (e.g., by modifying an argument of a direct call instruction or a jump instruction), such that after being patched-up the control flow targets a memory address of an optimized implementation of the function, rather than the default implementation of the function.

Figure 2:
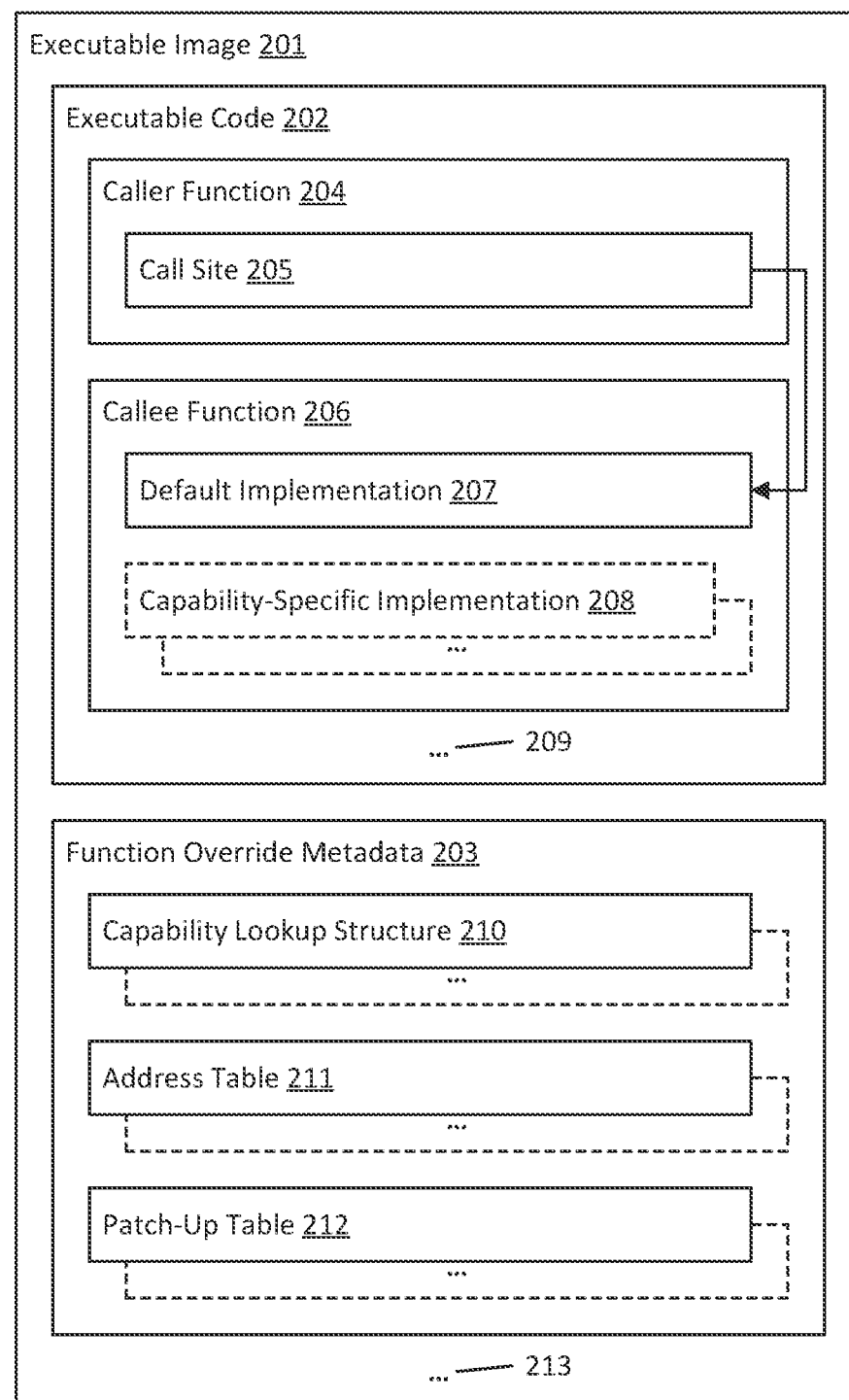
FIG. 2 illustrates an example of an executable image that includes a default implementation, and potentially one or more optimized implementations of at least one function.

FIG. 2 illustrates an example 200 of an executable image 201 that includes a default implementation, and possibly also one or more optimized implementations at least one function. In embodiments, executable image 201 is an example of executable image 117. FIG. 2 shows that the executable image 201 includes an executable code 202 section which, in turn, includes a caller function 204 and a callee function 206. An ellipsis 209 indicates that the executable code 202 can include other executable code (e.g., additional functions) as well.

As shown, the caller function 204 includes a call site 205, which in some embodiments is a direct call to a default implementation 207 of the callee function 206. By including a direct call, the call site 205 defaults to calling the default implementation 207, absent additional action by the OS loader 111. This means that executable image 201 is compatible with conventional OS loaders that lack the inventive functionality described herein. In embodiments, the default implementation 207 is a "generic" capability-agnostic implementation of the callee function 206. As used herein, a capability-agnostic implementation of a function relies only on core features of a target platform and that are generally common across instances of that target platform. Thus, the default implementation 207 is configured to be executable on all target platforms, regardless of their specific optional capabilities. For example, if the executable image 201 targets the X64 ISA and the WINDOWS OS, then the default implementation 207 of callee function 206 is executable on all X64 computer systems running a compatible WINDOWS OS, regardless of particular additional capabilities of those computer systems (e.g., ISA extensions, OS capabilities, additional accelerator hardware, etc.).

As shown, however, the executable code 202 may also include one or more capability-specific implementations (e.g., capability-specific implementation 208) of the callee function 206. In embodiments, each capability-specific implementation utilizes one or more specific optional capabilities (e.g., ISA extension, OS capability, additional accelerator hardware, etc.) that may be available at a given target computer, such as computer system 101. In embodiments, as part of loading one or more memory pages from the executable image 201 into process memory 109, the OS loader 111 determines that one of the capability-specific implementations (e.g., capability-specific implementation 208) is compatible with a set of capabilities available at the computer system 101. As such, prior to (or as part of) loading a memory page containing the call site 205 into the process memory 109, the OS loader 111 modifies the call site 205 to replace the direct call to the default implementation 207 with a direct call to capability-specific implementation 208.

In order to facilitate these call site modifications, the executable image 201 includes a function override metadata 203 section. As shown, in embodiments, the function override metadata 203 comprises one or more of a capability lookup structure 210 (or a plurality of capability lookup structures), an address table 211 (or a plurality of address tables), or a patch-up table 212 (or a plurality of patch-up tables).

An ellipsis 213 indicates that the executable image 201 can include other sections as well, such as additional sections appropriate to the PE format, the Mach-O format, or the ELF format.

In embodiments, the capability lookup structure 210 comprises information that is evaluated by the OS loader 111 to identify which function implementation to choose for a given function, given a set of capabilities available at computer system 101. While the particular structure and format of the capability lookup structure 210 can vary, in embodiments the capability lookup structure 210 comprises a binary decision tree, which may take the form of a reduced binary decision diagram (BDD). In general, a BDD is a data structure that is used to represent a Boolean function as a rooted, directed, acyclic graph. In embodiments, a BDD data structure comprises of a plurality of decision nodes and two or more terminal (i.e., leaf) nodes. In embodiments, each decision node represents a Boolean variable (e.g., the presence or absence of a particular capability), and has two child nodes—one corresponding to an assignment of the value "true" to that variable, and the other corresponding to an assignment of the value "false" to that variable. The terminal nodes correspond to true and false evaluations of the represented Boolean function as a whole.

In embodiments, each BDD represents a Boolean expression specifying a unique set of function override rules based on computer system capabilities, such as unique combinations of processor ISA extensions, OS capabilities, additional hardware capabilities, and the like. In embodiments a BDD's terminal node provides an indication of a function to use based on an evaluation of the function override rules embodied by the BDD. For example, in embodiments, terminal nodes may be associated with an offset (e.g., index) into one or more address tables (e.g., address table 211), or be associated with a default function implementation.

Figure 5:
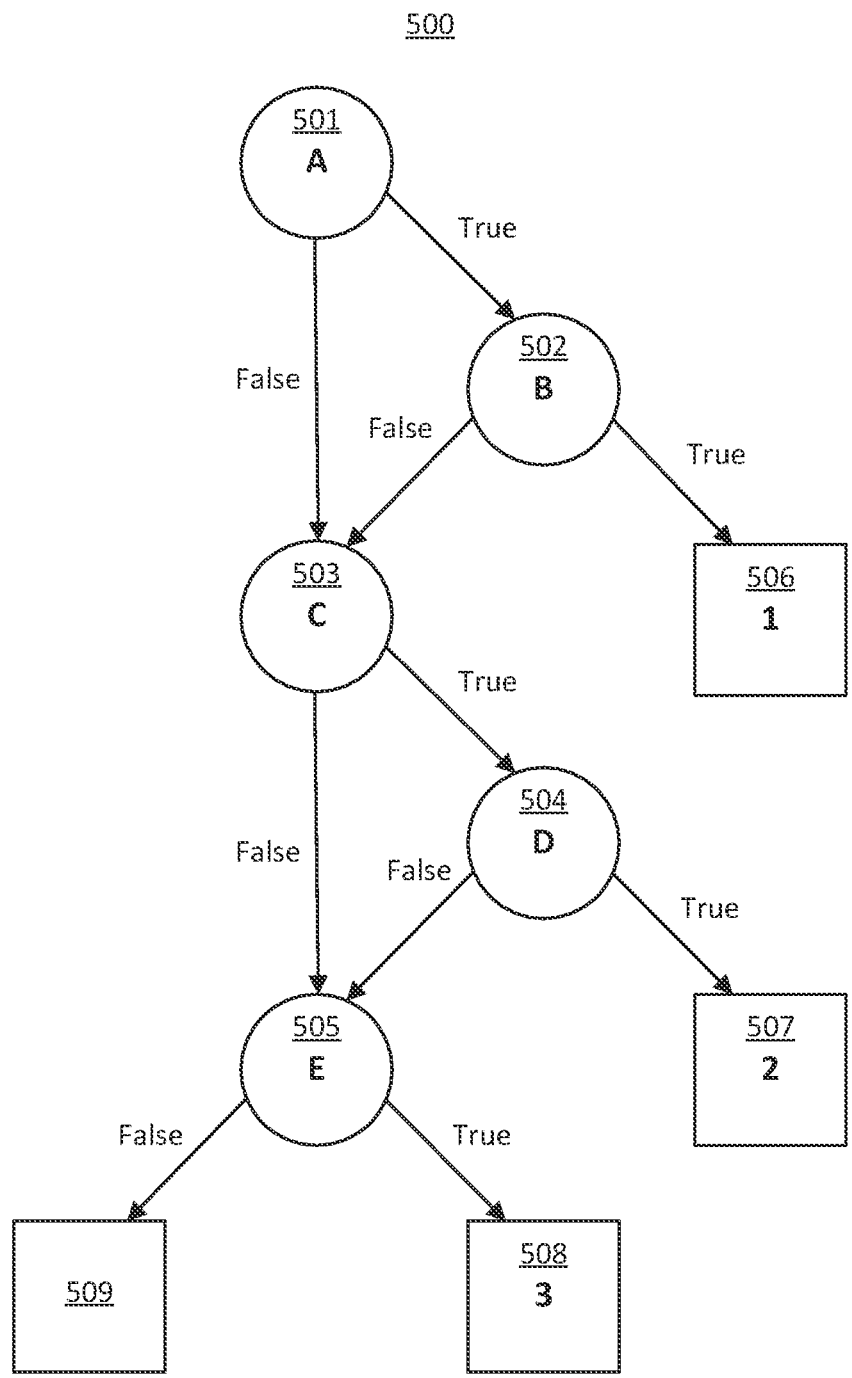
FIG. 5 illustrates an example of a binary decision diagram.

FIG. 5 illustrates an example of a BDD 500 comprising five decision nodes (i.e., nodes 501-505) and four terminal nodes (i.e., nodes 506-509). This BDD 500 embodies the following override rules:

A & B, 1
C & D, 2
E, 3

Evaluating BDD 500 starting at node 501, if capability A (node 501) and capability B (node 502) are present at computer system 101, evaluation of BDD 500 terminates at node 506, which indicates an address table index of one. If capabilities A & B are not present at computer system 101, evaluation of BDD 500 continues at node 503. Here, if capability C (node 503) and capability D (node 504) are present at computer system 101, evaluation of BDD 500 terminates at node 507, which indicates an address table index of two. If capabilities C & D are also not present at computer system 101, evaluation of BDD 500 continues at node 505. Here, if capability E (node 505) is present at computer system 101, evaluation of BDD 500 terminates at node 508, which indicates an address table index of three; otherwise, evaluation of BDD 500 terminates at node 509. Node 509 has special semantics—if reached, no override function is specified by BDD 500.

In embodiments, each address table 211 corresponds to a different capability-optimized function (i.e., a function such as callee function 206, for which there exists a default implementation and one or more optimized implementations). In embodiments, each record in the address table 211 comprises a relative virtual address (RVA) specifying a location within the executable image 201 of a different implementation of a capability-optimized function to which the address table 211 corresponds. When taken together with a capability lookup structure 210 comprising a BDD, an address table 211 can be used by the OS loader 111 to look up the RVA of an optimized implementation of a given function. For example, within the context of BDD 500, address table 211 can include a first entry with an RVA of a function implementation optimized for capabilities A and B, a second entry with an RVA of a function implementation optimized for capabilities C and D, and a third entry with an RVA of a function implementation optimized for capability E. Notably, BDDs and address tables can be structured in such a way that a given BDD can be utilized to provide indices into a plurality of different address tables.

In embodiments, the patch-up table 212 specifies one or more locations (relocation sites) within the executable code 202 at which a memory address for a generic implementation of a function can be substituted with a memory address for an optimized implementation of the function. In some embodiments, these location(s) are a call site, such as call site 205 but, in general, these location(s) can be any location in which a control flow instruction targets a memory address of a generic implementation of a function that can be substituted with a memory address for an optimized implementation of the function. In embodiments, the patch-up table 212 specifies these locations as offsets within the executable image 201, such as by RVA. While a single patch-up table could correspond to a plurality of functions, in embodiments there is a different patch-up table for each capability-optimized function.

Figure 3A:
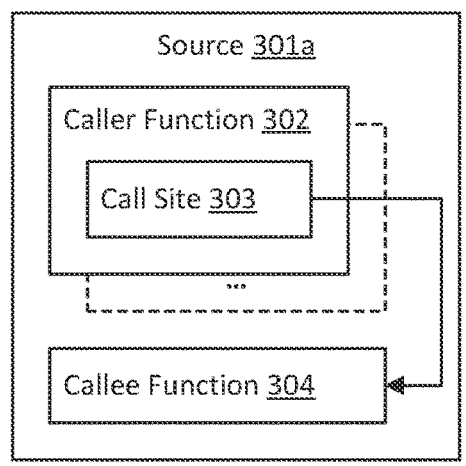
FIG. 3A illustrates an example of calling a capability-optimized function directly.

In embodiments, the patch-up table 212 specifies each identified location with a capability-optimized function as a destination. If this capability-optimized function is called frequently, this means that the patch-up table 212 could include a large number of entries. For example, FIG. 3A illustrates an example 300a of calling a capability-optimized function directly. Example 300a shows that, in source 301a, there is a caller function 302 that includes a call site 303 that directly calls a callee function 304 (e.g., a capability-optimized function). Referring to example 200, caller function 204 corresponds to caller function 302, call site 205 corresponds to call site 303, and callee function 206 corresponds to callee function 304. Referring to example 300a, there could be any number of caller functions that are similar to caller function 302. As such, the patch-up table 212 would need any entry for each call site in each of these caller functions.

Figure 3B:
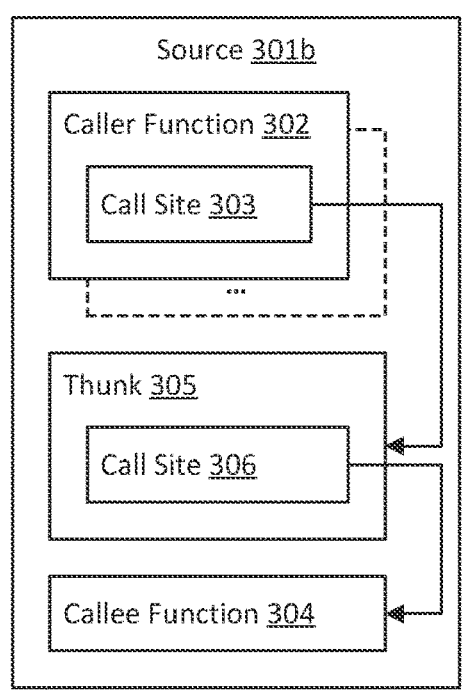
FIG. 3B illustrates an example of using a thunk function to call a capability-optimized function.

In embodiments, entries in the patch-up table 212 are reduced by instead calling a "thunk" function which, in turn, calls the capability-optimized function. This means that only the call site within the thunk function needs to be patched up, rather than each location that calls the thunk function. For example, FIG. 3B illustrates an example 300b of using a thunk function to call a capability-optimized function. Example 300b shows that, in source 301b, the call site 303 in the caller function 302 now directly calls thunk 305 (rather than the callee function 304, as in example 300a). The thunk 305, in turn, includes a call site 306 that directly calls the callee function 304. Notably, while example 300b shows the thunk 305 as being part of source 301b, in some embodiments a thunk is dynamically generated by a compiler toolchain. Referring to example 200, caller function 204 now corresponds to thunk 305, call site 205 now corresponds to call site 306, and callee function 206 still corresponds to callee function 304. Here, regardless of the number of caller functions that are similar to caller function 302, the patch-up table 212 only needs to include an entry corresponding to call site 306.

Figure 3C:
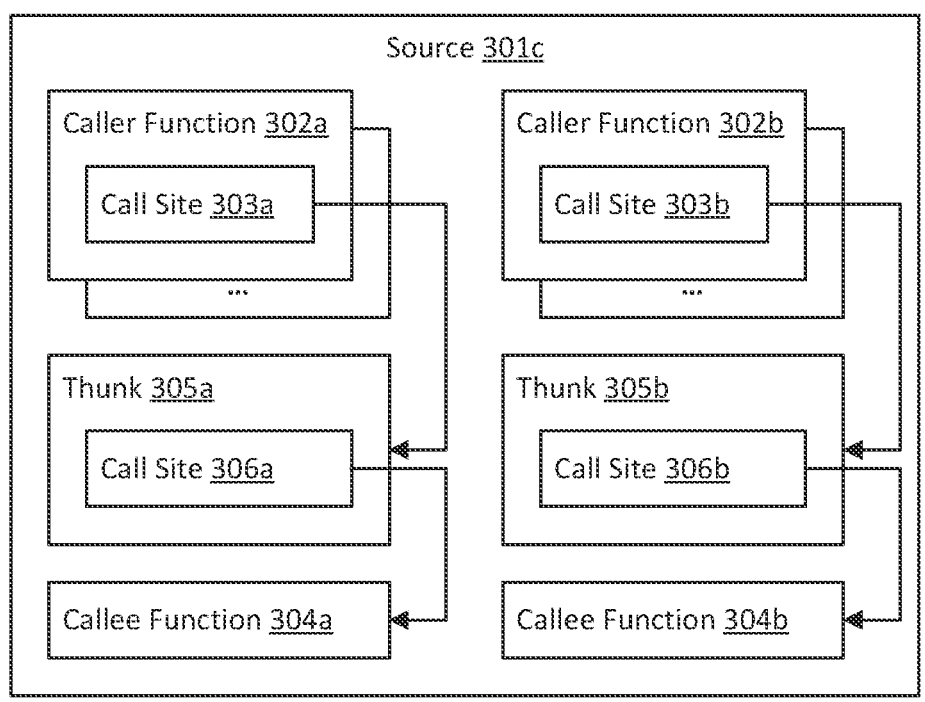
FIG. 3C illustrates an example of using multiple thunk functions with multiple sets of call sites.

Notably, there can be different thunks in a single executable image, each corresponding to a different set of call locations. For example, FIG. 3C illustrates an example 300c of using multiple thunk functions with multiple sets of call sites. In example 300c, source 301c includes a first set of caller functions, exemplified by caller function 302a, that have a call site 303a calling a thunk 305a that includes a call site 306a for calling a callee function 304a. In one example, thunk 305a is a "memcpy" thunk that directly calls a default implementation of memcpy (e.g., memcpy( )), or that can be patched-up to call optimized implementations of memcpy (e.g., memcpy_avx( ), memcpy_esrmb( ), etc.). In example 300c, there is also a second set of caller functions, exemplified by caller function 302b, that each have a call site 303b calling a thunk 305b that includes a call site 306b for calling a callee function 304b. In one example, thunk 305b is a "memmove" thunk that directly calls a default implementation of memmove, or that can be patched-up to call optimized implementations of memmove.

In embodiments, use of thunks (such as thunk 305 in example 300b) also facilitates code sharing between processes, particularly in the context of containerized environments. In some container environments, such as HYPER-V Isolation Containers, memory image pages are only shared between a container host and a container if those memory image pages have no relocation sites (e.g., call site 205) in them. By using thunks, embodiments can decrease the number of memory image pages that have relocation sites (e.g., by ensuring that only thunk memory pages have relocation sites), and therefore increase the number of memory pages that can be shared between host and container. In embodiments, when more than one thunk is present in an executable image (e.g., as in example 300c), those thunks are placed together (e.g., on the same memory page) to reduce a number of relocation sites.

Referring back to OS loader 111 in FIG. 1, the OS loader 111 is shown as including an executable image access component 112, a capability determination component 113, a metadata evaluation component 114, an address substitution component 115, and a memory page loading component 116. The depicted components of OS loader 111 represent various functions that the OS loader 111 might implement or utilize in accordance with various embodiments described herein. It will be appreciated, however, that the depicted components—including their identity, sub-components, and arrangement—are presented merely as an aid in describing various embodiments of the OS loader 111 described herein, and that these components are non-limiting to how software and/or hardware might implement various embodiments of the OS loader 111 described herein, or of the particular functionality thereof.

In embodiments, the executable image access component 112 accesses executable image 117 (e.g., executable image 201), such as based on a request to load and initiate execution of executable image 117. In embodiments, the capability determination component 113 determines a set of one or more capabilities of computer system 101, such as ISA extensions, OS capabilities (including security capabilities), accelerator hardware, and the like. In some embodiments, the capability determination component 113 operates based on the executable image access component 112 having accessed executable image 117 (e.g., based on the executable image 117 comprising function override metadata 203). In other embodiments, the capability determination component 113 operates at some other time independent of access of the executable image 117, such as during an OS boot process.

Based on having accessed the executable image 117, the metadata evaluation component 114 evaluates the function override metadata 203 contained therein. For example, the metadata evaluation component 114 evaluates the capability lookup structure 210 (or structures) to determine if the set of one or more capabilities of computer system 101 (as determined by the capability determination component 113) can be used to identify an optimized function implementation. For example, the metadata evaluation component 114 may evaluate one or more BDD's, in light of Boolean values derived from the set of one or more capabilities of computer system 101. As an additional example, the metadata evaluation component 114 evaluates the address table 211 (or tables), in light of the evaluation of the capability lookup structure 210, to determine address(es) for any applicable optimized function implementations specific to the set of one or more capabilities of computer system 101. As an additional example, the metadata evaluation component 114 evaluates the patch-up table 212 (or tables) to determine the location(s) at which address substitutions should be performed to call these optimized function implementation(s), rather than default function implementation(s). In embodiments, the metadata evaluation component 114 stores its results as loader metadata 110. In one example, in a WINDOWS environment, at least a portion of the loader metadata 110 could be stored as part of a dynamic value relocation table.

In embodiments, based on the loader metadata 110, and for each of one or more call sites, the address substitution component 115 "patches up" the binary by substituting a target memory address with a replacement target memory address for an optimized function implementation. In embodiments, the address substitution component 115 substitutes a direct call to a default implementation of a function with a direct call to an optimized implementation of the function, which is optimized based on the set of one or more capabilities of computer system 101.

In some embodiments, the address substitution component 115 patches up all locations identified in the loader metadata 110, loads the entirety of the executable image 117 into the process memory 109 using memory page loading component 116, and then initiates execution of the executable image 117. In other embodiments, the address substitution component 115 operates on-demand (e.g., lazily) as each memory page comprising one (or more) of these locations is being loaded by the memory page loading component 116. Thus, in embodiments, the OS loader 111 initiates execution of the executable image 117 prior to fully loading all memory pages of the executable image 117 into process memory 109, but patches up memory pages as they loaded into the process memory 109, as needed, prior to executing code from those memory pages. Either way, a program that has been patched-up to use an optimized implementation of a function is never exposed to a memory page that doesn't have a needed patch-up applied.

The components of the OS loader 111 are now described further in connection with FIG. 4, which illustrates a flow chart of an example method 400 for dynamically overriding a function based on a capability set. In embodiments, instructions for implementing method 400 are encoded as computer-executable instructions (e.g., OS loader 111) stored on a computer program product (e.g., storage media 104) that are executable by a processor (e.g., processor 102) to cause a computer system (e.g., computer system 101) to perform method 400.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring to FIG. 4, in embodiments, method 400 comprises an act 401 of, within an executable image, identifying a control flow that targets a callee function. In some embodiments, act 401 comprises reading a portion of an executable image file, the portion including a first memory address corresponding to a first callee function implementation, the first memory address having been inserted into the portion by a compiler toolchain. In some embodiments, the portion corresponds to a call site having as a call target, the first memory address. In an example, the executable image access component 112 access a portion of executable image 201, such as a portion corresponding to caller function 204. Here, the caller function 204 includes a call site having, as a call target, a first memory address corresponding to the default implementation 207 of callee function 206. In embodiments, act 401 is performed as part of loading of a memory page into process memory 109—either prior to execution of the executable image 201 or dynamically (e.g., on-demand) after executable image 201 has started—but prior to execution of code from the memory page being loaded.

As discussed in connection with FIG. 3B, the caller function 204 could be a thunk 305 used to call callee function 304. Thus, in some embodiments of act 401, the portion corresponds to a thunk used by a caller function to call a callee function.

Method 400 also comprises an act 402 of, based on extensible metadata, and based on a system-specific capability set, determining a replacement callee function. In some embodiments, act 402 comprises, based on extensible metadata included in the executable image file, and based on a capability set that is specific to the computer system, determining a second memory address corresponding to a second callee function implementation. In an example, based on an evaluation of function override metadata 203 by the metadata evaluation component 114, and based on a determination of a set of capabilities of the computer system 101 by the capability determination component 113, the address substitution component 115 determines that the destination address of call site 205 is to patch-up with a destination memory address of the capability-specific implementation 208. Effects of act 402 include dynamically identifying an optimized version of a function to execute at a computer system, based on a set of capabilities specific to that computer system.

As described, in embodiments a set of one or more capabilities of computer system 101 can include one or more of ISA extensions, OS capabilities (including security capabilities), accelerator hardware, and the like. Thus, in some embodiments of act 402, the capability set includes one or more of a processor architectural feature, an OS feature, a security feature, or a hardware functionality.

As described in connection with FIG. 2, in embodiments, the function override metadata 203 comprises a capability lookup structure 210, an address table 211, and a patch-up table 212. As described, in embodiments the capability lookup structure 210 comprises information that is evaluated by the OS loader 111 to decide which function implementation to choose for a given function, given a set of capabilities available at computer system 101. Thus, in some embodiments of act 402, the extensible metadata includes a data structure that maps the capability set that is specific to the computer system to an identification of the second memory address. As described, in some implementations the capability lookup structure 210 is a binary decision tree, which may take the form of a reduced BDD. Thus, in some embodiments of act 402, the data structure comprises a binary decision tree or a BDD.

As described, in embodiments the address table 211 specifies, for a given capability-optimized function, an RVA specifying a location within the executable image 201 of a different implementation of the capability-optimized function. When taken together with a capability lookup structure 210, an address table 211 can be used by the OS loader 111 to look up the RVA of an optimized implementation of a given function. Thus, in some embodiments of act 402, the identification of the second memory address is an offset within a memory address table for a callee function, each entry in the memory address table comprising a corresponding memory address for a different implementation of the callee function. In some embodiments, each memory address in the memory address table is an RVA.

As described, in embodiments the patch-up table 212 specifies one or more offsets within the executable code 202 at which a memory address for a generic implementation of a function can be substituted with a memory address for an optimized implementation of the function. Thus, in some embodiments of act 402, the extensible metadata includes an offset that identifies the portion.

Method 400 also comprises an act 403 of, prior to executing the call, modifying the control flow to target the replacement callee function. In some embodiments, act 403 comprises, before execution of the portion, modifying the portion to replace the first memory address with the second memory address. In an example, the address substitution component 115 patches-up the call site 205 with the destination memory address of the capability-specific implementation 208. Thus, prior to the executable image 117 executing any code from a memory page comprising the call site 205, the call site 205 is patched-up to have the destination memory address of the capability-specific implementation 208 as its target. Effects of act 403 include using a set of computer system specific capabilities to modify and executable to execute an optimized version of a function, rather than executing a default version of the function.

As mentioned, in some embodiments, the address substitution component 115 operates on-demand as a memory page comprising one (or more) of these call sites is being loaded by the memory page loading component 116. Thus, in some embodiments of act 403, modifying the portion is performed in connection with loading a memory page comprising the portion into memory.

As mentioned, in some embodiments, memory pages that are not patched-up are potentially available for loading into shared memory pages. Thus, in some embodiments of act 403, the memory page is loaded into shared memory that is utilized by at least one different executable image file.

In some embodiments, such as when loading the executable image 201 illustrated in example 200, the first callee function implementation is a capability-agnostic implementation (e.g., default implementation 207) of a callee function (e.g., callee function 206), and the second callee function implementation is a capability-specific implementation (e.g., capability-specific implementation 208) of the callee function that utilizes at least one capability in the capability set. In these embodiments, the first callee function implementation and the second callee function implementation both exist within the executable image 117. Thus, in some embodiments of method 400, the first callee function implementation is included in the executable image file, and the second callee function implementation is also included in the executable image file.

As indicated previously, it is possible that one of these implementations exists in an executable image file other than the one being loaded. In some embodiments, the principles herein can be used to provide a default implementation of a function within the executable image 117, but to call to another implementation of the function in some other executable image (e.g., a dynamically linked library, the OS itself, etc.) if that executable image is available at computer system 101 and if the computer system 101 meets a given set of capabilities. Thus, in some embodiments of method 400, the first callee function implementation is included in the executable image file, and the second callee function implementation is included in a different executable image file. In some embodiments, the executable image 117 includes only the default implementation, and lacks any optimized implementation of the function, instead relying on this other executable image to provide the optimized implementation. In one example, this is useful to utilize an OS special function, in which the OS dynamically inserts an optimized function into the process memory 109. Thus, in some embodiments of method 400, the second callee function implementation is an OS special function.

Accordingly, the embodiments described herein dynamically override a function based on a capability set during loading of an executable image into memory, based on replacing a first destination address of a default function implementation with a second destination address of a function implementation that is determined based on a capability set of the computer system on which the executable image is being loaded. As such, a destination address (e.g., of a direct call instruction, or of a jump instruction) is changed at load time, and prior to code execution, so that a function does not need to perform runtime checks, and so that a lookup for an indirect branch does not need to occur. The embodiments herein can dramatically speed up program execution, particularly if the called function is relatively small and called frequently. For example, if a tight loop calls a function that is implemented using the embodiments herein, calls to an optimized implementation of the function can be made with a simple direct call. Without the embodiments herein, each iteration of the loop would incur either the overhead of the function performing a runtime check for computer system capability and a potential branch misprediction, or the overhead of a destination memory address lookup and additional security checks. Additionally, since embodiments perform patch-ups to call an optimized implementation of a function at load time (e.g., as opposed to during execution time), a program that has been patched-up to use the optimized implementation of the function will never see a memory page that doesn't have the patch-up applied.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 101) that includes computer hardware, such as, for example, one or more processors (e.g., processor 102) and system memory (e.g., memory 103), as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an OS and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for dynamically overriding a function based on a capability set, the method comprising:
   reading a portion of an executable image file, the portion including a first memory address corresponding to a first callee function implementation, the first memory address having been inserted into the portion by a compiler toolchain, wherein the first callee function implementation is a capability-agnostic implementation of a callee function;
   based on extensible metadata included in the executable image file, and based on a capability set that is specific to the computer system, determining a second memory address corresponding to a second callee function implementation, wherein the second callee function implementation is a capability-specific implementation of the callee function that utilizes at least one capability in the capability set; and
   before execution of the portion, modifying the portion to replace the first memory address with the second memory address.

2. The method of claim 1, wherein modifying the portion is performed in connection with loading a memory page comprising the portion into memory.

3. The method of claim 2, wherein the memory page is loaded into shared memory that is utilized by at least one different executable image file.

4. The method of claim 1, wherein the first callee function implementation is included in the executable image file, and wherein the second callee function implementation is included in a different executable image file.

5. The method of claim 1, wherein the first callee function implementation is included in the executable image file, and wherein the second callee function implementation is also included in the executable image file.

6. The method of claim 1, wherein the second callee function implementation is an operating system special function.

7. The method of claim 1, wherein the portion corresponds to a thunk used by a caller function to call a callee function.

8. The method of claim 1, wherein the extensible metadata includes an offset that identifies the portion.

9. The method of claim 1, wherein the extensible metadata includes a data structure that maps the capability set that is specific to the computer system to an identification of the second memory address.

10. The method of claim 9, wherein the identification of the second memory address is an offset within a memory address table for a callee function, each entry in the memory address table comprising a corresponding memory address for a different implementation of the callee function.

11. The method of claim 10, wherein each memory address in the memory address table is a relative virtual address.

12. The method of claim 9, wherein the data structure comprises a binary decision tree or a binary decision diagram.

13. The method of claim 1, wherein the capability set includes one or more of a processor architectural feature, an operating system feature, a security feature, or a hardware functionality.

14. The method of claim 1, wherein the portion corresponds to a call site having as a call target, the first memory address.

15. A computer system for dynamically overriding a function based on a capability set, comprising:
  a processor; and
  a computer storage media that stores computer-executable instructions that are executable by the processor to cause the computer system to at least:
    read a portion of an executable image file, the portion including a first memory address corresponding to a first callee function implementation, the first memory address having been inserted into the portion by a compiler toolchain, wherein the first callee function implementation is a capability-agnostic implementation of a callee function;
    based on extensible metadata included in the executable image file, and based on a capability set that is specific to the computer system, determine a second memory address corresponding to a second callee function implementation, wherein the second callee function implementation is a capability-specific implementation of the callee function that utilizes at least one capability in the capability set; and
    before execution of the portion, modify the portion to replace the first memory address with the second memory address.

16. The computer system of claim 15, wherein modifying the portion is performed in connection with loading a memory page comprising the portion into shared memory that is utilized by at least one different executable image file.

17. The computer system of claim 15, wherein the extensible metadata includes a data structure that maps the capability set that is specific to the computer system to an identification of the second memory address.

18. A computer program product comprising a physical storage media that stores computer-executable instructions that are executable by a processor to cause a computer system to dynamically override a function based on a capability set, the computer-executable instructions including instructions that are executable by the processor to cause the computer system to at least:
  read a portion of an executable image file, the portion including a first memory address corresponding to a first callee function implementation, the first memory address having been inserted into the portion by a compiler toolchain, wherein the first callee function implementation is a capability-agnostic implementation of a callee function;
  based on extensible metadata included in the executable image file, and based on a capability set that is specific to the computer system, determine a second memory address corresponding to a second callee function implementation, wherein the second callee function implementation is a capability-specific implementation of the callee function that utilizes at least one capability in the capability set; and
  before execution of the portion, modify the portion to replace the first memory address with the second memory address.

* * * * *